United States Patent [19]

Himori

[11] Patent Number: 5,071,936
[45] Date of Patent: Dec. 10, 1991

[54] DITHIOCARBAMATE GROUP-CONTAINING POLYSILOXANES

[75] Inventor: Shunichi Himori, Yokkaichi, Japan

[73] Assignee: Mitsubishi Petrochemical Company Limited, Tokyo, Japan

[21] Appl. No.: 486,849

[22] Filed: Mar. 1, 1990

[30] Foreign Application Priority Data

Mar. 1, 1989 [JP] Japan ................................. 1-49068

[51] Int. Cl.$^5$ ............................................. C08G 77/04
[52] U.S. Cl. .......................................... 528/26; 528/28; 525/474; 556/420
[58] Field of Search ................... 528/26, 28; 556/420; 525/474

[56] References Cited

U.S. PATENT DOCUMENTS 3,906,018 9/1975 Ostrozynski .................... 556/420
4,382,983 5/1983 Yuyama et al. .................... 528/14

Primary Examiner—Melvyn I. Marquis
Attorney, Agent, or Firm—Oblon, Spivak, McClelland, Maier & Neustadt

[57] ABSTRACT

A dithiocarbamate group-containing polysiloxane represented by the following general formula (I):

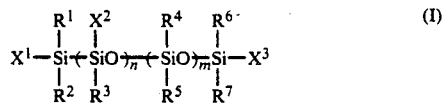

wherein $X^1$, $X_2$ and $X^3$ each stand for:
(a) a dithiocarbamate-containing group represented by the formula:

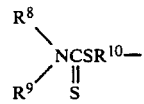

wherein $R^8$ and $R^9$ each denote a hydrogen atom or an alkyl group having 1 to 10 carbon atoms, and $R^{10}$ stands for a benzyl-containing group

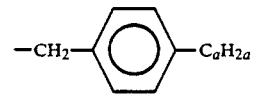

with a being a natural number of 1 to 10 or an alkylene group having 1 to 10 carbon atoms,
(b) a dithiocarbamate group represented by the formula:

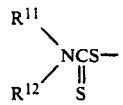

wherein $R^{11}$ and $R^{12}$ each denote a hydrogen atom or an alkyl group having 1 to 10 carbon atoms,
(c) a hydrocarbyl or hydrocarbyloxy group having 1 to 10 carbon atoms,
(d) a fluoroalkyl group having 1 to 10 carbon atoms and 1 to 17 fluorine atoms, or
(e) a hydroxyl group; provided that at least one of $X^1$, $X^2$ and $X^3$ is the dithiocarbamate-containing group (a) or the dithiocarbamate group (b); and
$R^1$ to $R^7$ each stand for:
(f) a hydrocarbyl or hydrocarbyloxy group having 1 to 10 carbon atoms,
(g) a fluoroalkyl group having 1 to 10 carbon atoms and 1 to 17 fluorine atoms, or
(h) a hydroxyl group; and
n is a natural number of 1 to 10 and m is a natural number of 20 to 800.

6 Claims, No Drawings

DITHIOCARBAMATE GROUP-CONTAINING POLYSILOXANES

BACKGROUND OF THE INVENTION

1. Field of the Invention

This invention relates to a polysiloxane having high photopolymerization inducibility with respect to radical-polymerizable monomers. More specifically, this invention relates to a polysiloxane containing a dithiocarbamate group as a photo-functional group.

As is well known in the art, polysiloxanes which are generally called silicone have for their own properties water repellency, lubricating properties, releasability, resistance to thrombus, biocompatibility, chemical resistance, water resistance, weather resistance, electrical insulating properties, heat resistance, cold resistance and so on (see Isao NAKAJIMA and Kinji ARIGA "Silicon Resins", Nikkan Kogyo Shinbunsha (1960)). On the other hand, great expectations are placed on such polysiloxanes for use in fields where photo-reactions such as photo-curing and photopolymerization are utilized, for instance, in the fields of photo-resists, photoflexographic inks, photo-curing inks, photo-curing paints, photo-curing adhesives, photo-curing binders, photo-curing sealants, medical materials and dental materials.

The present invention provides a polysiloxane photopolymerization initiato r having high photopolymerization inducibility with respect to radical-polymerizable monomers.

2. Background Art

Heretofore, the following techniques have been proposed for the application of polysiloxanes to photopolymerization systems.

(1) Polysiloxanes are merely mechanically mixed with radical-polymerizable monomers and photo-initiators to carry out photopolymerization, thereby obtaining polymer compositions.

(2) Polysiloxane macro-monomers are mechanically mixed with radical-polymerizable monomers and photoinitiators to carry out photopolymerization, thereby obtaining graft polymers (see, e.g., Japanese Patent Laid-Open (Kokai) Publication No. 61-19606).

A problem with the above technique (1) is that since the product is only a mixture of polysiloxanes with other polymers, macro-phase separation, bleeding-out and interface separation and other phenomena will inevitably occur between the two polymers and the product will hardly possess or retain the desired properties of polysiloxanes per se.

With the above technique (2), on the other hand, it is possibly expected to prevent such phenomena as mentioned in (1), for instance, macro-phase separation, bleeding-out and interface separation, from taking place due to polysiloxanes being chemically bonded to the polymers formed by photopolymerization. However, a problem with this is again the failure of the possession of the desired properties of polysiloxanes per se due to the fact that the mobility of polysiloxane macro-monomers is in fact so low and the life of the formed polymer radicals is so short that the probability of contact of both materials is considerably small, thus allowing much unreacted matter to remain in the product.

SUMMARY OF THE INVENTION

A main object of the present invention is, therefore, to provide a polysiloxane useful as a photopolymerization initiator, with which the above problems can be solved.

Thus, the present invention provides a dithiocarbamate group-containing polysiloxane represented by the following general formula (I):

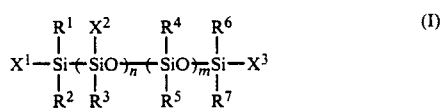

wherein $X^1$, $X^2$ and $X^3$ each stand for:

(a) a dithiocarbamate-containing group represented by the formula:

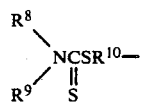

wherein $R^8$ and $R^9$ each denote a hydrogen atom or an alkyl group having 1 to 10 carbon atoms, and $R^{10}$ stands for a benzyl-containing group

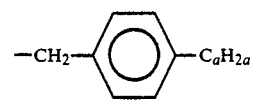

with a being a natural number of 1 to 10 or an alkylene group having 1 to 10 carbon atoms, (b) a dithiocarbamate group represented by the formula:

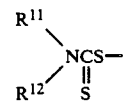

wherein $R^{11}$ and $R^{12}$ each denote a hydrogen atom or an alkyl group having 1 to 10 carbon atoms, (c) a hydrocarbyl or hydrocarbyloxy group having 1 to 10 carbon atoms, (d) a fluoroalkyl group having 1 to 10 carbon atoms and 1 to 17 fluorine atoms, or (e0 a hydroxyl group; provided that at least one of $X^1$, $X^2$ and $X^3$ is the dithiocarbamate-containing group(a) or the dithiocarbamate group (b); and $R^1$ to $R^7$ each stand for:

(f) a hydrocarbyl or hydrocarbyloxy group having 1 to 10 carbon atoms, (g) a fluoroalkyl group having 1 to 10 carbon atoms and 1 to 17 fluorine atoms, or (h) a hydroxyl group; and n is a natural number of 1 to 10 and m is a natural number of 20 to 800.

With the dithiocarbamate group-containing polysiloxane of the formula (I) according to the present invention, which possesses such properties as described below and exhibits very high photopolymerization inducibility with respect to radical-polymerizable monomers, the above mentioned problems involved in the use of conventional polysiloxanes in the photopolymerization systems can be sufficiently solved.

DETAILED DESCRIPTION OF THE INVENTION

[I] Dithiocarbamate Group-Containing Polysiloxane

Properties of the Polysiloxane (a) Photopolymerization Inducibility

Because of containing at least one dithiocarbamate group in the molecule, the dithiocarbamate group-containing polysiloxane of the present invention having the formula (I) (which may hereinafter sometimes be referred to simply as the polysiloxane photo-initiator) possesses photopolymerization inducibility. As is well known in the art (from, e.g., "Kogyo Kagaku Zasshi", Vol. 67, No. 12 (1964), p. 2108 ff.), dithiocarbamate group is subject to radical dissociation by light, thus exhibiting high polymerization inducibility and photosensitivity.

As is also well known in the art (from, e.g., "Polymer Journal", Vol. 16, No. 6 (1984), p. 511 ff.), such a photopolymerization is a radical polymerization and, substantially comes to be a living polymerization. Therefore, the polysiloxane photoinitiator maintains polymerization inducibility without deactivation, as long as it is irradiated with or exposed to light.

The polysiloxane photo-initiator possesses photopolymerization inducibility with respect to either the so-called monofunctional monomer having one radical-polymerizable double bond in its molecule or the so-called polyfunctional monomer having two or more radical-polymerizable double bonds, insofar as they are radical-polymerizable monomers (hereinafter radical-polymerizable monomer(s) may sometimes simply be called monomer(s)). It is to be understood that it is possible to make use of inherent properties of the dithiocarbamate group, other than its photopolymerization inducibility, for example, resistance to radiation, pharmacological activities such as herbicidal activity, complex formability and hydrophilic nature.

(b) Control of the Structure, etc. of the Polymer Product

It is possible to control the structure of the polymer products by suitably selecting the molecular structure of the polysiloxane photo-initiator used and the type of monomers used. For instance, it is possible to obtain an AB-type block copolymer by the polymerization of monofunctional monomers with the use of the polysiloxane photo-initiator having a dithiocarbamate group at one end of the molecule. An AB-type block copolymer can be obtained by the polymerization of monofunctional monomers with the use of the polysiloxane photo-initiator having dithiocarbamate groups at both ends of the molecule. With the use of the polysiloxane photo-initiator having (a) dithiocarbamate group(s) in the main chain except its ends, monofunctional monomers may be polymerized into graft copolymers. Graft block copolymers may be obtained by the polymerization of monofunctional monomers with the use of the polysiloxane photo-initiator having dithiocarbamate groups both at end(s) and in the main chain of the molecule.

When a monofunctional monomer is used as a monomer, it is possible to control the degree of polymerization or the molecular weight of the polymer product by suitably selecting a molar ratio of the polysiloxane photoinitiator to the monomer. For instance, a polymer having a molecular weight of 10,000 may be obtained by the polymerization of 100 g (1 mole) of methyl methacrylate having a molecular weight of 100 with the use of 100 g (0.02 mole) of the polysiloxane photo-initiator having a molecular weight of 5,000. If 300 g of the same methyl methacrylate are polymerized with the use of 100 g of the same initiator, then a polymer having a molecular weight of 20,000 may be obtained.

When a monomer mixture containing a polyfunctional monomer is polymerized with the use of the polysiloxane photo-initiator of any of the above mentioned molecular structures, then a crosslinked polymer having a three-dimensional network, i.e., a gel, may be obtained.

On the other hand, a dithiocarbamate group is well known to function as a polymerization initiator, a chain transfer agent and a polymerization terminator in photopolymerization, the reaction mechanism of which has already been clarified.

When polymerization is carried out using the polysiloxane photo-initiator of the present invention, the dithiocarbamate group-containing polysiloxane is dissociated into polysiloxane radical and dithiocarbamate radical by the irradiation of light, the former taking part in an initiation reaction and the latter participating in a stop reaction. When the irradiation of light is terminated or when the monomer is used up, the dithiocarbamate radical then adds to a growing terminal as a stopper, thus again forming a dithiocarbamate group. Hence, it is possible to use the thus formed polymer as a high-molecular photo-initiator capable of initiating or inducing photopolymerization.

By carrying out further polymerization of other monomers with the use of the thus formed high-molecular photo-initiator, it is optionally possible to obtain polymers having various molecular structures such as ABC-type block copolymers, multi-block copolymers, graft block copolymers and grafted gels. It is thus possible to provide, for example, functional high-molecular materials and elastomers.

Definition of the Polysiloxane

The dithiocarbamate group-containing polysiloxane according to the present invention is defined by the above mentioned general formula (I).

If any one of $X^1$ to $X^3$ is the hydrocarbyl group (c) having 1 to 10 carbon atoms rather than either the dithiocarbamate-containing group (a) or the dithiocarbamate group (b), it is preferably an alkyl, phenyl or lower alkyl-substituted phenyl group. If any one of $X^1$ to $X^3$ is the fluoroalkyl (d), then it may preferably be a perfluoroalkyl group, since the polymer product is strongly affected by a fluorine atom.

In the case where the hydrocarbyl group (c) is an alkyl group as well as in the definition of $R^1$ to $R^{12}$, "alkyl group" and "alkylene group" are often preferably lower alkyl and alkylene groups, esp., having about 1 to 4 carbon atoms. When $R^{10}$ is a benzyl-containing group, then a is often preferably about 1 to 4.

n is a factor that significantly governs the amount of the dithiocarbamate group contained in the polysiloxane, while m is a factor that governs the molecular weight of the polysiloxane. When n exceeds 10, mutual bonding between the photo-initiators, is likely to occur during a photo-reaction, resulting in their gelation, whereby polymerization of monomers may not proceed. When m is below 20, the formed polymer hardly exhibits the various properties of the polysiloxane per se, whereas when m exceeds 800, the polymerization inducibility of the polysiloxane is considerably reduced, since the concentration of the dithiocarbamate group becomes relatively small. Preferable ranges of n and m are 1 to 5 and 40 to 400, respectively.

In preferable compounds, $X^1$ to $X^3$ each are represented by the following formula:

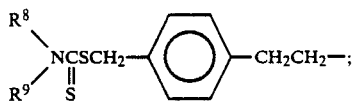

$R^1$ to $R^7$ each are a methyl or phenyl group; and $R^{8-9}$ and $R^{1112}$ ech are an ethyl grup.

Synthesis of the Polysiloxane

The dithiocarbamate group-containing polysiloxane of the formula (I) may be synthesized at high yield by, for example, the substitution reaction between a halogenated polysiloxane with a dithiocarbamate. This reaction permits the halogen moiety of the halogenated polysiloxane to be quantitatively replaced by the dithiocarbamate group. In view of the rate of substitution, the halogen is preferably chlorine or bromine.

The halogenated polysiloxane used for the above reaction may be synthesized optionally by the living anion or living cation polymerization or polycondensation of cyclosiloxane oligomers. For instance, polysiloxanes chlorinated at one end may be synthesized according to the procedures described in "Polymer Preprints, Japan", Vol 35, No. 2, p. 336. Specifically, for example, a monomer hexamethylcyclotrisiloxane is subjected to living anion polymerization using butyllithium as a catalyst, and the reaction product is then allowed to react with dimethylchlorosilane, thereby obtaining polydimethylsiloxane having hydrogen bonded to silicon at one end of the molecule. In the presence of a platinum catalyst, this polydimethylsiloxane and para-chloromethylstyrene are then subjected to hydrosilylation, thereby obtaining a polysiloxane chlorinated at one end.

Polysiloxanes halogenated at both ends may be synthesized according to the procedures described in "Journal of Polymer Science; Part A; Polymer Chemistry", Vol. 24 (1986), p. 197. Specifically, living cation polymerization is carried out using, e.g., octamethylcyclotetrasiloxane as a monomer, tetramethylsiloxane as a chain stopper and an acid-treated bentonite as a catalyst to obtain a polydimethylsiloxane having hydrogen bonded to silicon at both ends of the molecular chain. In the presence of a platinum catalyst, this polydimethylsiloxane and para-chloromethylstyrene are then subjected to hydrosilylation to obtain a polysiloxane chlorinated at both $\alpha$ and $\omega$ ends.

It is possible to control the degree of polymerization or molecular weight of the obtained polysiloxanes chlorinated at both ends of the molecule by regulating the monomer to catalyst ratio in the case of living anion polymerization and the monomer to chain stopper ratio in the case of living cation polymerization. Since both the polymerization methods are living polymerizations, it is possible to obtain polymers in which the ratio between the weight-average molecular weight and the number-average molecular weight is very close to 1.

Halogenated polysiloxane containing (a) halogen(s) in the main molecular chain other than its ends may be obtained by, for example, carrying out ring opening copolymerization of cyclosiloxane and chlorinated cyclosiloxane, or the ring opening copolymerization of cyclosiloxane according to the procedures described in "Makromolekulare Chemie", Vol. 186, p. 1203 to synthesize a polysiloxane containing hydrogen atoms bonded to silicon, which is then hydrosilylated with para-chloromethylstyrene in the presence of a platinum catalyst to give a chlorinated polysiloxane. Such polysiloxanes containing hydrogen atoms bonded to silicon are easily available commercially, for instance, SH-1107 made by Toray Silicone and KF-99 made by Shinetsu Silicone.

The substitution reaction between the above halogenated polysiloxanes and sodium dithiocarbamate is usually carried out at a temperature of 50° to 90° C. with the use of an organic solvent such as toluene, xylene or ethyl acetate in an atmosphere of an inert gas such as nitrogen. In this reaction, use may be made of an interphase transfer catalyst such as trioctylmethylammonium chloride or tetrabutylammonium bromide.

[II] Use as a Photopolymerization Initiator

Radical-Polymerizable Monomers

As radical-polymerizable monomers to be polymerized using the dithiocarbamate group-containing polysiloxane of the formula (I) as a photopolymerization initiator, use may be made of either monofunctional monomers having one radical-polymerizable double bond or polyfunctional monomers having two or more radical-polymerizable double bonds, insofar as they are monomers having at least one ethylenic double bond capable of radical polymerization, viz., radical-polymerizable double bond.

The monofunctional monomers may include aromatic monovinyl monomers such as styrene, p-chloromethylstyrene, o-aminostyrene and α-methylstyrene; a (meth)acrylic monomer such as (meth)acrylic acid, methyl (meth)acrylate, ethyl (meth)acrylate, n-butyl (meth)acrylate, i-butyl (meth)acrylate, t-butyl (meth)acrylate, 2-ethylhexyl (meth)acrylate, n-octyl (meth)acrylate, i-octyl (meth)acrylate, 1-methyl-heptyl (meth)acrylate, n-nonyl (meth)acrylate, hydroxyethyl (meth)acrylate, glycidyl (meth)acrylate, acrylonitrile, methacrylonitrile and (meth)acrylamide; halogenated vinyls such as vinyl chloride; halogenated vinylidenes such as vinylidene chloride; vinyl acetate; isobutylene; vinylidene cyanide; vinylpyrrolidone; vinylpyridine; N-vinylcarbazole; methyl vinyl ketone; vinyl isocyanate; maleic anhydride; N-substituted maleimide; and the like. Additionally, use may be made of macromonomers containing one radical-polymerizable vinyl group in the molecule with the main chain composed of styrene, a (meth)acrylic ester or the like.

Examples of bifunctional monomers containing two radical-polymerizable double bonds in the molecule may include 1,3-butanediol-di(meth)acrylate, 1,4-butanediol-di(meth)acrylate, 1,6-hexanediol-di(meth)acrylate, polyethylene glycol-di(meth)acrylate, diethylene glycol-di(meth)acrylate, neopentyl glycol-di(meth)acrylate, triethylene glycol-di(meth)acrylate, tripropylene glycol-di(meth)acrylate, hydroxypivalate neopentyl glycol-di(meth)acrylate, trimethylolpropane-di(meth)acrylate , bis[(meth)acryloxyethoxy]bisphenol A, bis[(meth)acryloxyethoxy]tetrabromobisphenol A, bis[(meth)acryloxypolyethoxy]bisphenol A, 1,3-bis(hydroxyethyl)-5,5-dimethylhydantoin, 3-methylpentanediol-di(meth)acrylate, di(meth)acrylates of hydroxypivalate neopentyl glycol derivatives and divinylbenzene.

Examples of polyfunctional monomers having at least three radical-polymerizable double bonds in the molecule may include trimethylolpropane-tri(meth)acrylate, pentaerythritol-tri(meth)acrylate, pentaerythritol-tetra(meth)acrylate, dipentaerythritol-monohydroxypenta(meth)acrylate, tris(2-hydroxyethyl isocyanate)-tri(meth)acrylate, tris(diethylene glycol)trimelate-tri(meth)acrylate. Additionally, use may be made of macro-monomers containing at least two radical-polymerizable vinyl groups in the molecule with the main chain composed of styrene, a (meth)acrylic ester or the like.

The terms "(meth)acryl" and "(meth)acrylate" used herein refer to "acryl and methacryl" and "acrylates and methcarylate", respectively, and the term "(meth)acryloxy" refers to "acryloxy and methacryloxy".

Polymerization

The polysiloxane photo-initiator of the present invention is decomposed by the irradiation of ultraviolet rays having the energy required for the radical dissociation of the dithiocarbamate group and having a wavelength of 250 to 500 nm, preferably 300 to 400 nm, thereby initiating or inducing the polymerization of the above described monomers which are allowed to co-exist with the initiator.

Provided that the required energy is imparted to the dithiocarbamate group of the polysiloxane, any one of bulk, solution, suspension, slurry, emulsion, dispersion and the like polymerization methods may be used.

As a solvent to be used for solution polymerization, use may preferably be made of a solvent which does not exhibit characteristic absorption on UV rays of 250 to 500 nm, has a small chain transfer constant and is able to sufficiently dissolve monomers and polymers Examples of such preferred solvents are benzene, toluene, xylene, ethylbenzene, acetone, methyl ethyl ketone, methyl isobutyl ketone, ethyl acetate, methyl cellosolve, ethyl cellosolve, dimethylformamide, isopropyl alcohol, butanol, hexane and heptane.

The rate of polymerization is not appreciably reduced in an ordinary atmosphere of air, but an inert gas atmosphere such as nitrogen or argon may preferably be used as a polymerization atmosphere. Regarding the polymerization temperature, a temperature less than 10° C. is not preferred, since the rate of growth reaction of radical polymerization is too low. A temperature exceeding 150° C. is again not preferred, since thermal polymerization then takes place as a non-negligible side reaction.

The polymer after the completion of photopolymerization may be made inactive with respect to UV rays by treatment of its terminal dithiocarbamate group. This may be achieved, for example, by treating said polymer with an acidic or basic solution or at a high temperature of 150° C. or higher for several minutes; by the irradiation of high-energy electromagnetic radiation at a wavelength of 220 nm or below; by carrying out photopolymerization after the addition of a monomer containing an ultraviolet-absorbing group; or by mere addition of an ultraviolet absorber It is also possible to substitute the terminal dithiocarbamate group by the addition of a reagent having a high chain transfer constant such as thiols to the polymer, while it is irradiated with ultraviolet rays.

[III]Experimental Examples

Preparation Example A

A reaction flask equipped with a stirrer was charged with 500 g of polydimethylsiloxane having hydrogen bonded to silicon at one end and having a number-average molecular weight of 5,000, synthesized by anion polymerization, 305 g of p-chloromethylstyrene, 5 g of a platinum catalyst and 1,000 g of toluene, which were then subjected to reaction at 50° C. for 5 hours in a nitrogen atmosphere. Upon removal of unreacted matter, the solvent and the catalyst, 490 g of a polydimethylsiloxane chlorinated at one terminal was obtained Next, into a reaction flask equipped with a stirrer were placed 400 g of this chlorinated polydimethylsiloxane, 26.5 g of sodium diethyldithiocarbamate and 400 g of toluene, which were then subjected to reaction at 60° C. for 5 hours in a nitrogen atmosphere. Upon removal of the solvent and unreacted matter, 388 g of a dithiocarbamate group-containing polysiloxane was obtained. Subsequent ultraviolet absorbance analysis and calculation indicated that about 0.98 mole of the dithiocarbamate group was added to one mole of the polysiloxane. The polysiloxane thus obtained will be hereinafter referred to as "polysiloxane A".

Preparation Example B

A reaction flask equipped with a stirrer was charged with 500 g of polysiloxane having hydrogen bonded to silicon at both ends and having a number-average molecular weight of 5,000, synthesized by cation polymerization, 610 g of p-chloromethylstyrene, 5 g of a platinum catalyst and 1,500 g of toluene, which were then subjected to reaction at 50° C. for 5 hours in a nitrogen atmosphere. Upon removal of unreacted matter, the solvent and the catalyst, 504 g of a polydimethylsiloxane chlorinated at both ends was obtained Next, into a reaction flask equipped with a stirrer were placed 400 g of this chlorinated polydimethylsiloxane, 53 g of sodium diethyldithiocarbamate and 400 g of toluene, which were then subjected to reaction at 60° C. for 5 hours in a nitrogen atmosphere. Upon removal of the solvent and unreacted matter, 388 g of a dithiocarbamate group-containing polysiloxane was obtained. Subsequent ultraviolet absorbance analysis and calculation indicated that about 1.98 moles of the dithiocarbamate group was added to one mole of the polysiloxane. The polysiloxane thus obtained will be hereinafter referred to as "polysiloxane B".

Preparation Example C

A reaction flask equipped with a stirrer was charged with 500 g of polydimethylsiloxane synthesized by ring opening copolymerization, having a number-average molecular weight of 5,000 and having 5 moles of hydrogen bonded to silicon per mole of the polymer, 1,400 g of p-chloromethylstyrene, 5 g of a platinum catalyst and 2,000 g of toluene, which were then subjected to reaction at 50° C. for 5 hours in a nitrogen atmosphere. Upon removal of unreacted matter, the solvent and the catalyst, 547 g of a polydimethylsiloxane chlorinated at one end was obtained.

Next, into a reaction flask equipped with a stirrer were placed 400 g of this chlorinated polydimethylsiloxane, 130 g of sodium diethyldithiocarbamate and 400 g of toluene, which were then subjected to reaction at 60° C. for 5 hours in a nitrogen atmosphere. Upon removal of the solvent and unreacted matter, 410 g of a dithiocarbamate group-containing polysiloxane was obtained. Subsequent ultraviolet absorbance analysis and calculation indicated that about 4.81 moles of the dithiocarbamate group was added to one mole of the polysiloxane. The polysiloxane thus obtained will be hereinafter referred to as "polysiloxane C".

Preparation Example D

A reaction flask equipped with a stirrer was charged with 500 g of polydimethylsiloxane synthesized by anion polymerization, having hydrogen bonded to silicon at one end and having a number-average molecular weight of 5,000, 153 g of allyl chloride, 5 g of a platinum catalyst and 1,000 g of toluene, which were then subjected to reaction at 50° C. for 5 hours in a nitrogen atmosphere. Upon removal of unreacted matter, the solvent and the catalyst, 482 g of a polydimethylsiloxane chlorinated at one end was obtained.

Next, into a reaction flask equipped with a stirrer were placed 400 g of this chlorinated polydimethylsiloxane, 26.5 g of sodium diethyldithiocarbamate and 400 g of toluene, which were then subjected to reaction at 60° C. for 5 hours in a nitrogen atmosphere. Upon removal of the solvent and unreacted matter, 382 g of a dithiocarbamate group-containing polysiloxane was obtained. Subsequent ultraviolet absorbance analysis and calculation indicated that about 0.98 mole of the dithiocarbamate group was added to one mole of the polysiloxane. The polysiloxane thus obtained will be hereinafter referred to as "polysiloxane D".

Preparation Example E

A reaction flask equipped with a stirrer was charged with 500 g of polydimethylsiloxane synthesized by anion polymerization, having hydrogen bonded to silicon at one end and having a number-average molecular weight of 10,000, 153 g of p-chloromethylstyrene, 5 g of a platinum catalyst and 800 g of toluene, which were then subjected to reaction at 50° C. for 5 hours in a nitrogen atmosphere. Upon removal of unreacted matter, the solvent and the catalyst, 482 g of a polydimethylsiloxane chlorinated at one end was obtained.

Next, into a reaction flask equipped with a stirrer were placed 400 g of this chlorinated polydimethylsiloxane, 140 g of sodium diethyldithiocarbamate and 400 g of toluene, which were then subjected to reaction at 60° C. for 5 hours in a nitrogen atmosphere. Upon removal of the solvent and unreacted matter, 370 g of a dithiocarbamate group-containing polysiloxane was obtained. Subsequent ultraviolet absorbance analysis and calculation indicated that about 0.98 mole of the dithiocarbamate group was added to one mole of the polysiloxane. The polysiloxane thus obtained will be hereinafter referred to as "polysiloxane E".

EXAMPLE 1

Into a pyrex vessel were placed 50 g of polysiloxane A, 50 g of methyl methacrylate and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 93 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is an AB-type block copolymer having a micro-domain structure.

EXAMPLE 2

Into a pyrex vessel were placed 50 g of polysiloxane A, 50 g of styrene and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 92 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is an AB-type block copolymer having a micro-domain structure.

EXAMPLE 3

Into a pyrex vessel were placed 50 g of polysiloxane A, 50 g of butyl acrylate and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 94 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is an AB-type block copolymer having a micro-domain structure.

EXAMPLE 4

Into a pyrex vessel were placed 50 g of polysiloxane B, 50 g of methyl methacrylate and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 95 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is an ABA-type block copolymer having a micro-domain structure.

EXAMPLE 5

Into a pyrex vessel were placed 50 g of polysiloxane C, 50 g of methyl methacrylate and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 96 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is a graft copolymer having a micro-domain structure.

EXAMPLE 6

Into a pyrex vessel were placed 50 g of polysiloxane D, 50 g of methyl methacrylate and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 90 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is an AB-type block copolymer having a micro-domain structure.

EXAMPLE 7

Into a pyrex vessel were placed 50 g of polysiloxane E, 50 g of methyl methacrylate and 200 g of toluene, and a gas remaining in the vessel was thoroughly replaced with nitrogen. Thereafter, the vessel was tightly plugged and irradiated with ultraviolet rays for 10 hours, while the internal temperature of the vessel was maintained at 60° C., at a position spaced 15 cm away from an ultraviolet lamp of 400 W (a high-pressure mercury lamp H400PL made by Toshiba Denzai), thereby obtaining a pale yellow, viscous polymer solution, which was then purified by precipitation with 3 liters of hexane. The precipitate was dried in a vacuum drier at 60° C. for 10 hours to obtain 93 g of a polymer product.

Measurement was carried out with this polymer product to determine its average molecular weight by gel permeation chromatography (GPC), its glass transition temperature on a differential scanning calorimeter (DSC) and its morphology under a scanning-type electron microscope. Table 1 shows the results, which indicate that this polymer is an AB-type block copolymer having a micro-domain structure.

TABLE 1

| | Average Molecular Weight | | | |
|---|---|---|---|---|
| | Number-Average | Weight-Average | Glass Transition Temperature | Morphology |
| Ex. 1 | $1.12 \times 10^4$ | $2.02 \times 10^4$ | $-120°$ C. and $105°$ C. | Micro-domain |
| Ex. 2 | $1.10 \times 10^4$ | $2.05 \times 10^4$ | $-120°$ C. and $100°$ C. | Micro-domain |
| Ex. 3 | $0.98 \times 10^4$ | $2.25 \times 10^4$ | $-120°$ C. and $-50°$ C. | Micro-domain |
| Ex. 4 | $1.14 \times 10^4$ | $2.10 \times 10^4$ | $-120°$ C. and $104°$ C. | Micro-domain |
| Ex. 5 | $1.20 \times 10^4$ | $2.31 \times 10^4$ | $-120°$ C. and $104°$ C. | Micro-domain |
| Ex. 6 | $0.96 \times 10^4$ | $2.56 \times 10^4$ | $-120°$ C. and $104°$ C. | Micro-domain |
| Ex. 7 | $2.36 \times 10^4$ | $4.01 \times 10^4$ | $-120°$ C. and $105°$ C. | Micro-domain |

EXAMPLE 8

16 g of polysiloxane C was well mixed with 4 g of 1,6-hexanediol-dicarylate, and the mixture was coated on a glass board to a thickness of 50 μm with a bar coater. This coating was carried out with ease, giving a uniform and smooth film. With an ultraviolet irradiator (Tosscure 400 made by Toshiba Denzai) located 2 cm above this film, it was irradiated with ultraviolet rays for 1 minute. Crosslinking took place, giving a tough cured film. An angle of contact of the film with water was 101°.

EXAMPLE 9

The procedure of Example 8 was repeated except for using 4 g of pentaerythritol-triacrylate in place of 4 g of 1,6-hexanediol-diacrylate to produce a cured film. An angle of contact of this film with water was 102°.

What is claimed is:

1. A dithiocarbamate group-containing polysiloxane represented by the following general formula (I):

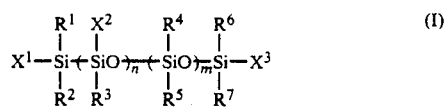

wherein $X^1$, $X^2$ and $X^3$ each stand for:

(a) a dithiocarbamate-containing group represented by the formula:

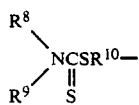

wherein $R^8$ and $R^9$ each denote a hydrogen atom or an alkyl group having 1 to 10 carbon atoms, and $R^{10}$ stands for a benzyl-containing group

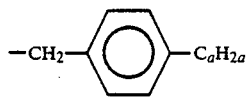

with a being a natural number of 1 to 10 or an alkylene group having 1 to 10 carbon atoms, (b) a dithiocarbamate group represented by the formula:

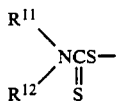

wherein $R^{11}$ and $R^{12}$ each denote a hydrogen atom or an alkyl grop having 1 to 10 carbon atoms, (c) a hydrocarbyl or hydrocarbyloxy group having 1 to 10 carbon atoms, (d) a fluoroalkyl group having 1 to 10 carbon atoms, and 1 to 17 fluorine atoms, or (e) a hydroxyl group; provided that at least one of $X^1$, $X^2$ and $X^3$ is the dithiocarbamate-containing group (a) or the dithiocarbamate group (b); and $R^1$ to $R^7$ each stand for:

(f) a hydrocarbyl or hydrocarbyloxy group having 1 to 10 carbon atoms, (g) a fluoroalkyl group having 1 to 10 carbon atoms, and 1 to 17 flourine atoms, or (h) a hydroxyl group; and N is a natural number of 1 to 10 and m is a natural number of 20 to 800.

2. The dithiocarbamate group-containing polysiloxane according to claim 1, wherein the hydrocarbyl group (c0 is an alkyl, phenyl or lower alkyl-substituted phenyl group.

3. The dithiocarbamate group-containing polysiloxane according to claim 1, wherein the fluoroalkyl group (d) is a perfluoroalkyl group.

4. The dithiocarbamate group-containing polysiloxane according to claim 1, wherein $R^{10}$ stands for the benzyl-containing group with a being a natural number of 1 to 4.

5. The dithiocarbamate group-containing polysiloxane according to claim 1, wherein n ranges from 1 to 5 and m ranges from 40 to 400.

6. The dithiocarbamate group-containing polysiloxane according to claim 1, wherein at least one of $X^1$ to $X^3$ stands for

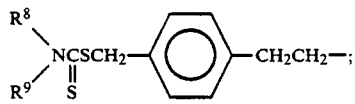

$R^1$ to $R^7$ each stand for a methyl or phenyl group; and $R^8$ and $R^9$ each stand for an ethyl group.

* * * * *